(12) United States Patent
Jones et al.

(10) Patent No.: US 7,641,327 B2
(45) Date of Patent: Jan. 5, 2010

(54) REPLACEABLE INK STICK GUIDES AND SUPPORTS

(75) Inventors: Brent Rodney Jones, Sherwood, OR (US); David L. Knierim, Wilsonville, OR (US); Edward F. Burress, West Linn, OR (US); Ernest Isreal Esplin, Sheridan, OR (US); Richard Guy Chambers, Portland, OR (US); Jasper Kent Wong, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 511 days.

(21) Appl. No.: 11/581,898

(22) Filed: Oct. 17, 2006

(65) Prior Publication Data

US 2008/0088687 A1    Apr. 17, 2008

(51) Int. Cl.
*B41J 2/175* (2006.01)
*G01D 11/00* (2006.01)
(52) U.S. Cl. .............................. 347/88; 347/99; 347/103
(58) Field of Classification Search .................... 347/88, 347/99, 103
See application file for complete search history.

(56) References Cited

U.S. PATENT DOCUMENTS

| 6,053,608 | A | 4/2000 | Ishii et al. |
| 6,254,228 | B1 | 7/2001 | Sago |
| 6,719,419 | B2 | 4/2004 | Jones et al. |
| 6,722,764 | B2 | 4/2004 | Jones et al. |
| 6,739,713 | B2 | 5/2004 | Jones et al. |
| 6,840,613 | B2 | 1/2005 | Jones |
| 2003/0202077 | A1* | 10/2003 | Jones et al. .................... 347/99 |
| 2005/0151814 | A1* | 7/2005 | Wong et al. .................... 347/88 |

* cited by examiner

*Primary Examiner*—Matthew Luu
*Assistant Examiner*—Rut Patel
(74) *Attorney, Agent, or Firm*—Maginot, Moore & Beck, LLP

(57) ABSTRACT

A removable ink stick support for use in an ink loader of a phase change ink imaging device having a first end for ink stick support proximate a melt end of an ink loader and a second end for ink stick support proximate an insertion end of an ink loader. A longitudinal member extends between the first and second ends, the longitudinal member being configured to provide a contact surface for contacting at least a portion of an ink stick as the ink stick is fed along the feed channel.

19 Claims, 18 Drawing Sheets

REPLACEABLE INK STICK GUIDES AND SUPPORTS

CROSS-REFERENCE TO RELATED APPLICATIONS

Reference is made to commonly-assigned U.S. patent application Ser. No. 11/582,075, filed concurrently herewith, entitled "INK LOADER MECHANISM USING AN INK STICK CARRIER", by Brent R. Jones, commonly-assigned U.S. patent application Ser. No. 11/581,881, filed concurrently herewith, entitled "COLLAPSIBLE INK LOADER FEED SUPPORT", by Brent R. Jones et al., as well as commonly assigned U.S. Pat. No. 6,840,613 to Brent R. Jones, the disclosures of which are incorporated herein by reference.

TECHNICAL FIELD

This disclosure relates generally to ink printers, the ink sticks used in such ink printers, and the devices and methods used to provide ink to such printers.

BACKGROUND

Solid ink or phase change ink printers conventionally receive ink in a solid form, either as pellets or as ink sticks. The solid ink pellets or ink sticks are placed in a feed chute and a feed mechanism delivers the solid ink to a heater assembly. Solid ink sticks are either gravity fed or urged by a spring through the feed chute toward a heater plate in the heater assembly. The heater plate melts the solid ink impinging on the plate into a liquid that is delivered to a print head for jetting onto a recording medium. U.S. Pat. No. 5,734,402 for a Solid Ink Feed System, issued Mar. 31, 1998 to Rousseau et al.; and U.S. Pat. No. 5,861,903 for an Ink Feed System, issued Jan. 19, 1999 to Crawford et al., the disclosures of which are incorporated herein by reference, describe exemplary systems for delivering solid ink sticks into a phase change ink printer.

Ink sticks for phase change ink printers ("phase change in sticks") have historically included bottom and side keying surfaces by which corresponding chutes and feed mechanisms (i.e., "ink loaders") of the printers guide or coax the ink sticks into optimal feed/melt positions. In horizontal or near horizontal ink loaders, gravity influences the ink stick positions as the ink sticks lean against chute walls or special side-rails. Special channels or guides have even been incorporated into the bottoms of some ink sticks to facilitate their movement over corresponding bottom-rails of some horizontal feed ink loaders. Such guides, coupled with gravity, have typically worked reasonably well to properly position and orient the ink sticks for feeding to the heater plates.

However, the wax-like components from which phase change ink sticks are typically made are typically designed to bond to media of many different types, and, accordingly, they are typically somewhat sticky by nature. Consequently, some phase change ink printers have presented problems with frictional "ratcheting" (i.e., intermittent sticking or alternating sticking and slipping) and even jamming of ink sticks in their ink loaders during operations for pushing the ink sticks through their ink loaders in conventional sliding fashions. Residual ink stick material rubbed onto ink loader surfaces during operations has, in some cases, contributed to such problems.

Additionally, some ink sticks have been so saturated with color dye that it has been difficult for printer users to distinguish between them by color alone. Cyan, magenta, and black ink sticks in particular have historically been difficult to distinguish visually based on color. On occasion, users have attempted to load ink sticks into the wrong places. With some printers including keying mechanisms to prevent ink sticks from being loaded improperly, some attempts to incorrectly load the ink sticks have sheared, chipped, or otherwise broken off fragments from the ink sticks. Aside from the general stickiness of the whole or intact ink sticks, in some cases such fragments have molded flow ribs and/or acted as wedges within ink loaders that have significantly encumbered and/or jammed advances of ink sticks through the ink loaders. Servicing some ink loaders affected by such fragments has been undesirably difficult and time consuming.

Ink loaders typically hold many ink sticks at once and each individual ink stick typically must travel several times its length to reach the melt plate. The risks of an ink stick frictionally ratcheting or jamming in an ink loader typically increase in proportion to the ink loader length and complexity of the feed path. Ink loaders are not generally accommodating of cleaning in the field as the guide and support surfaces are at least partially inaccessible. Support and guide elements within the ink loader that would benefit from field cleaning or replacement are not removable.

SUMMARY

A removable ink stick support for use in an ink loader of a phase change ink imaging device comprises a longitudinal member that extends between the first end proximate the melt area and second end proximate the insertion area that is configured to provide a contact surface for contacting at least a portion of an ink stick as the ink stick is fed along the feed channel.

In accordance with another aspect, a solid ink feed system for use in a phase change ink imaging device comprises an ink loader having an insertion end and a melt end, and at least one removable guide rail that is selectively mounted within the ink loader. The guide rail extends at least partially from the insertion end to the melt end and is configured to provide a contact surface for guiding an ink stick intermediate said insertion end to said melt end. At least one guide element formed in a portion of a solid ink stick may be configured to slidingly engage the contact surface of the at least one removable guide rail.

In accordance with a further aspect, a method of feeding an ink stick in a solid ink feed system of a phase change ink jet printer comprises removably connecting at least one support member to a longitudinal feed channel of a solid ink feed system such that the at least one guide rail extends between an insertion end to a melt end of the feed channel. At least one ink stick is then inserted into the feed channel. The at least one ink stick is contacted with a contact surface of the at least one support member. The at least one ink stick is then urged along the feed channel such that the at least one support member provides all or a substantial portion of the feed support and/or guidance. The guide and support members described are field installable and field replaceable and may therefore be removed for cleaning and reinstallation.

DETAILED DESCRIPTION OF THE PREFERRED EMBODIMENT

Figure 1:
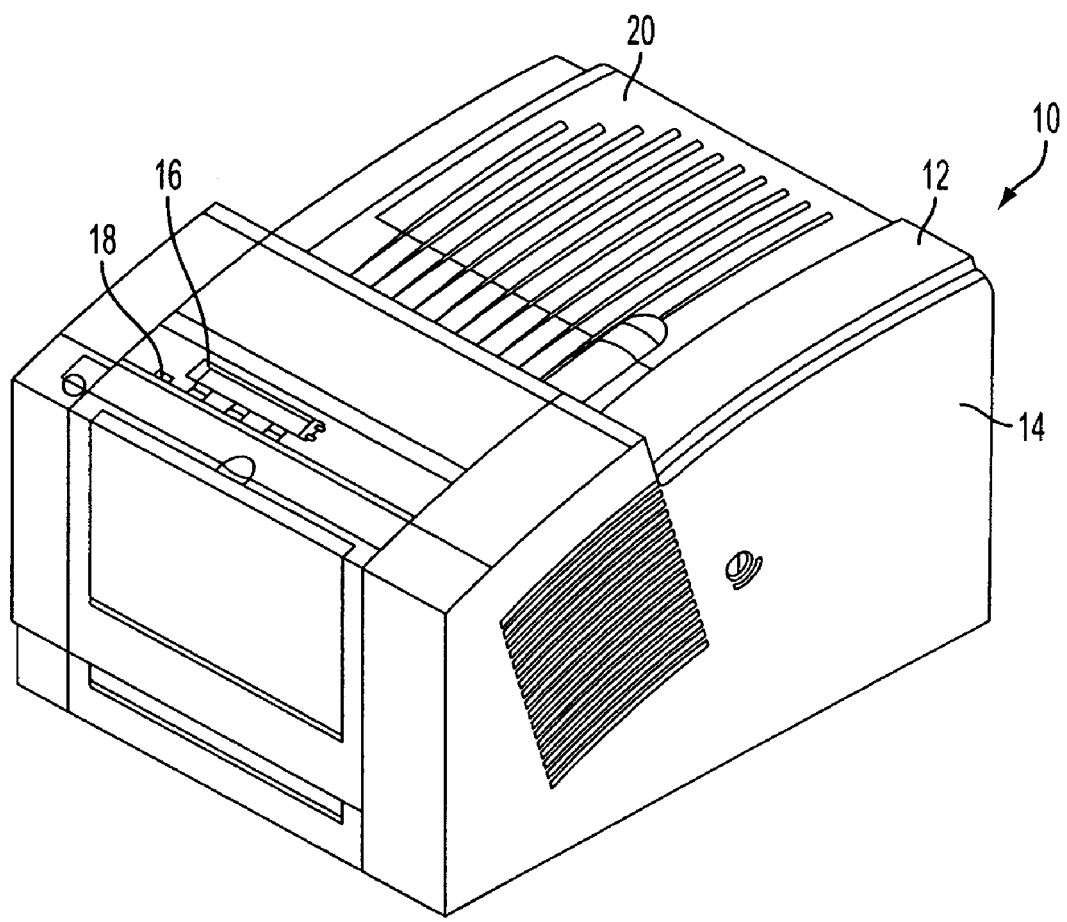
FIG. 1 is a perspective view of an exemplary phase change ink printer.

For a general understanding of the present embodiments, reference is made to the drawings. In the drawings, like reference numerals have been used throughout to designate like elements.

Figure 2:
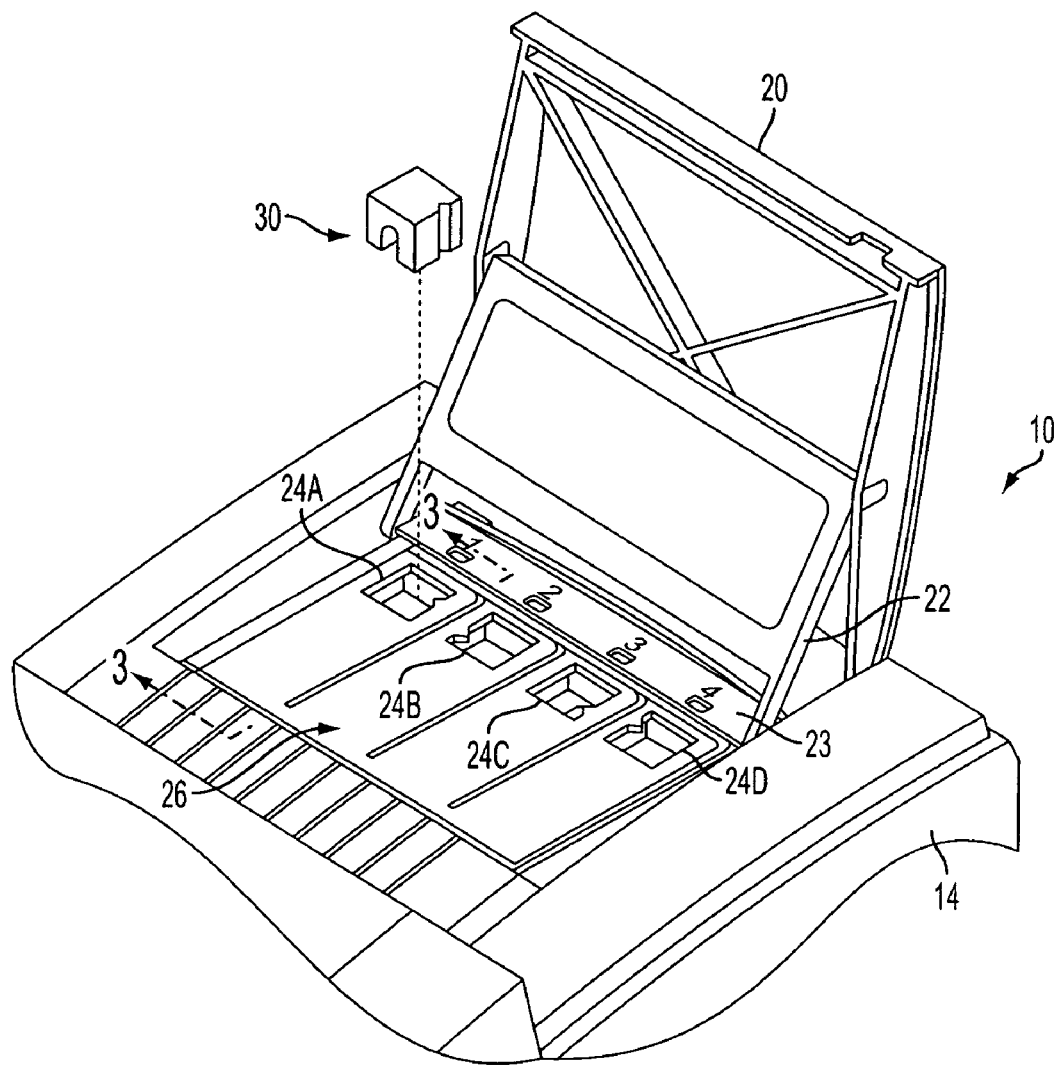
FIG. 2 is a partial top perspective view of the phase change ink printer of FIG. 1 with its ink access cover open.

FIG. 1 shows a solid ink, or phase change, ink printer 10 that includes an outer housing having a top surface 12 and side surfaces 14. A user interface, such as a front panel display screen 16, displays information concerning the status of the printer, and user instructions. Buttons 18 or other control elements for controlling operation of the printer are adjacent the user interface window, or may be at other locations on the printer. An ink jet printing mechanism (not shown) is contained inside the housing. An ink feed system delivers ink to the printing mechanism. The ink feed system is contained under the top surface of the printer housing. The top surface of the housing includes a hinged ink access cover 20 that opens as shown in FIG. 2, to provide the user access to the ink feed system.

In the particular printer shown, the ink access cover 20 is attached to an ink load linkage element 22 so that when the printer ink access cover 20 is raised, the ink load linkage 22 slides and pivots to an ink load position. As seen in FIG. 2, opening the ink access cover reveals a key plate 26 having keyed openings 24A, 24B, 24C, 24D. Each keyed opening 24A, 24B, 24C, 24D provides access to an insertion end of one of several individual feed channels 28A, 28B, 28C, 28D of the solid ink feed system (see FIGS. 2 and 3).

Figure 3:
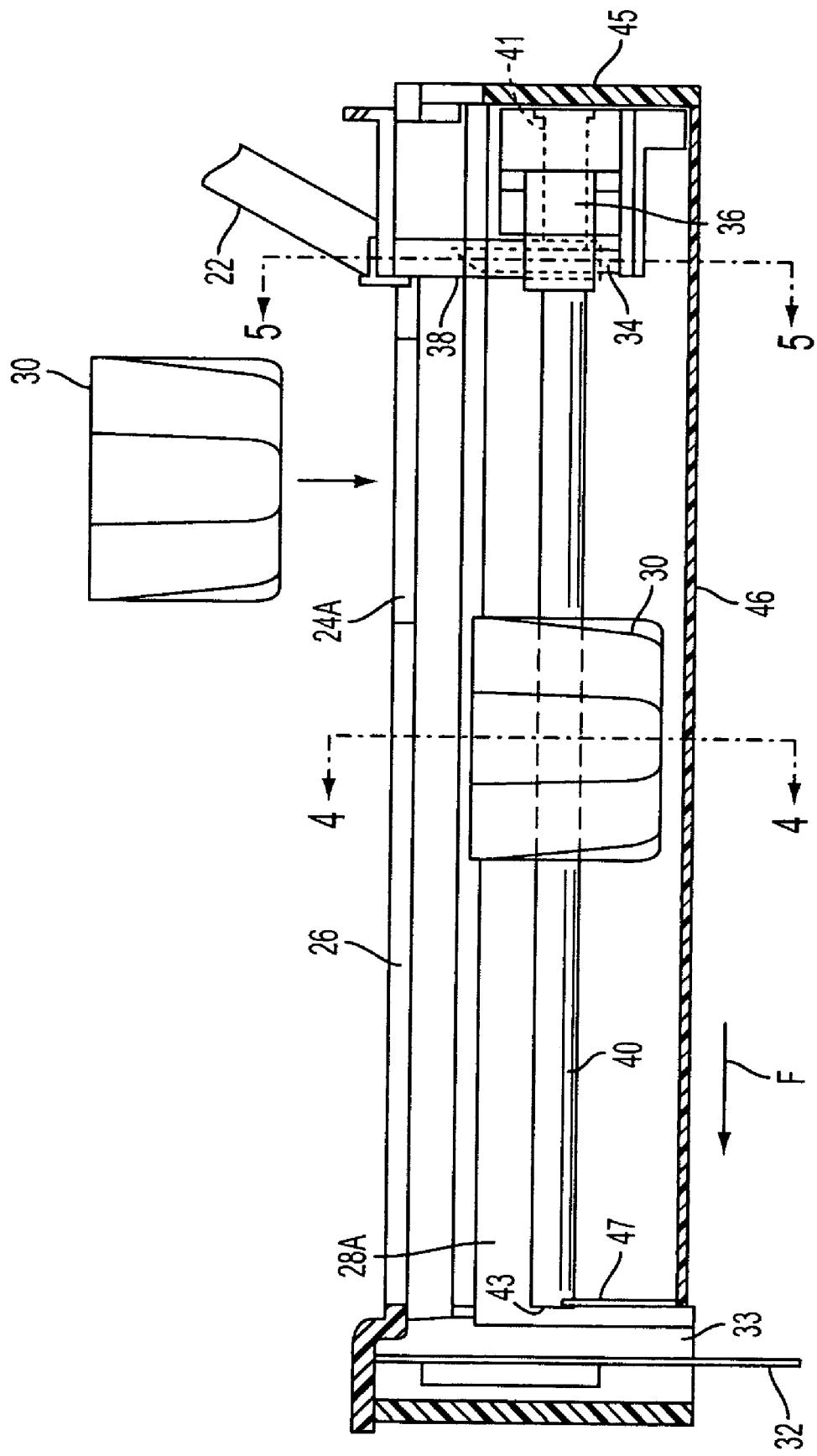
FIG. 3 is a side sectional view of a feed channel of the solid ink feed system of the phase change ink printer of FIG. 1 (and FIG. 2) taken along line 9-9 of FIG. 2.

Referring now to FIG. 3, each longitudinal feed channel, such as exemplary feed channel 28A delivers ink sticks 30 of one particular color to a corresponding melt plate 32. Each feed channel has a longitudinal feed direction F from the insertion end of the feed channel to the melt end of the feed channel. In the embodiment of FIG. 3, the melt end of the feed channel is adjacent the melt plate. Descriptions of insertion end and melt or exit end define a general area rather than a specific point. The melt plate melts the solid ink stick into a liquid form. The melted ink drips through a gap 33 between the melt end of the feed channel and the melt plate, and into a liquid ink reservoir (not shown). The feed channels 28 have a longitudinal dimension from the insertion end to the melt end, and a lateral dimension, substantially perpendicular to the longitudinal dimension. Each feed channel in the particular embodiment illustrated includes a push block 34 driven by a driving force or element, such as a constant force spring 36, to push the individual ink sticks along the length of the longitudinal feed channel toward the melt plates 32 that are at the melt end of each feed channel. The tension of the constant force spring 36 drives the push block toward the melt end of the feed channel. The ink load linkage 22 is coupled to a yoke 38, which is attached to the constant force spring 36 mounted in the push block 34. The attachment to the ink load linkage 22 pulls the push block 34 toward the insertion end of the feed channel when the ink access cover is raised to reveal the key plate 26. The constant force spring 36 can be a flat spring with its face oriented along a substantially vertical axis.

A color printer typically uses four colors of ink (yellow, cyan, magenta, and black). Ink sticks 30 of each color are delivered through a corresponding individual one of the feed channels 28A, 28B, 28C, 28D. The operator of the printer exercises care to avoid inserting ink sticks of one color into a feed channel for a different color. Ink sticks may be so saturated with color dye that it may be difficult for a printer user to tell by color alone which color is which. Cyan, magenta, and black ink sticks in particular can be difficult to distinguish visually based on color appearance. The key plate 26 has keyed openings 24A, 24B, 24C, 24D to aid the printer user in ensuring that only ink sticks of the proper color are inserted into each feed channel. Each keyed opening 24A, 24B, 24C, 24D of the key plate has a unique shape. The ink sticks 30 of the color for that feed channel have a shape corresponding to the shape of the keyed opening. The keyed openings and corresponding ink stick shapes exclude from each ink feed channel ink sticks of all colors except the ink sticks of the proper color for that feed channel.

Figure 4:
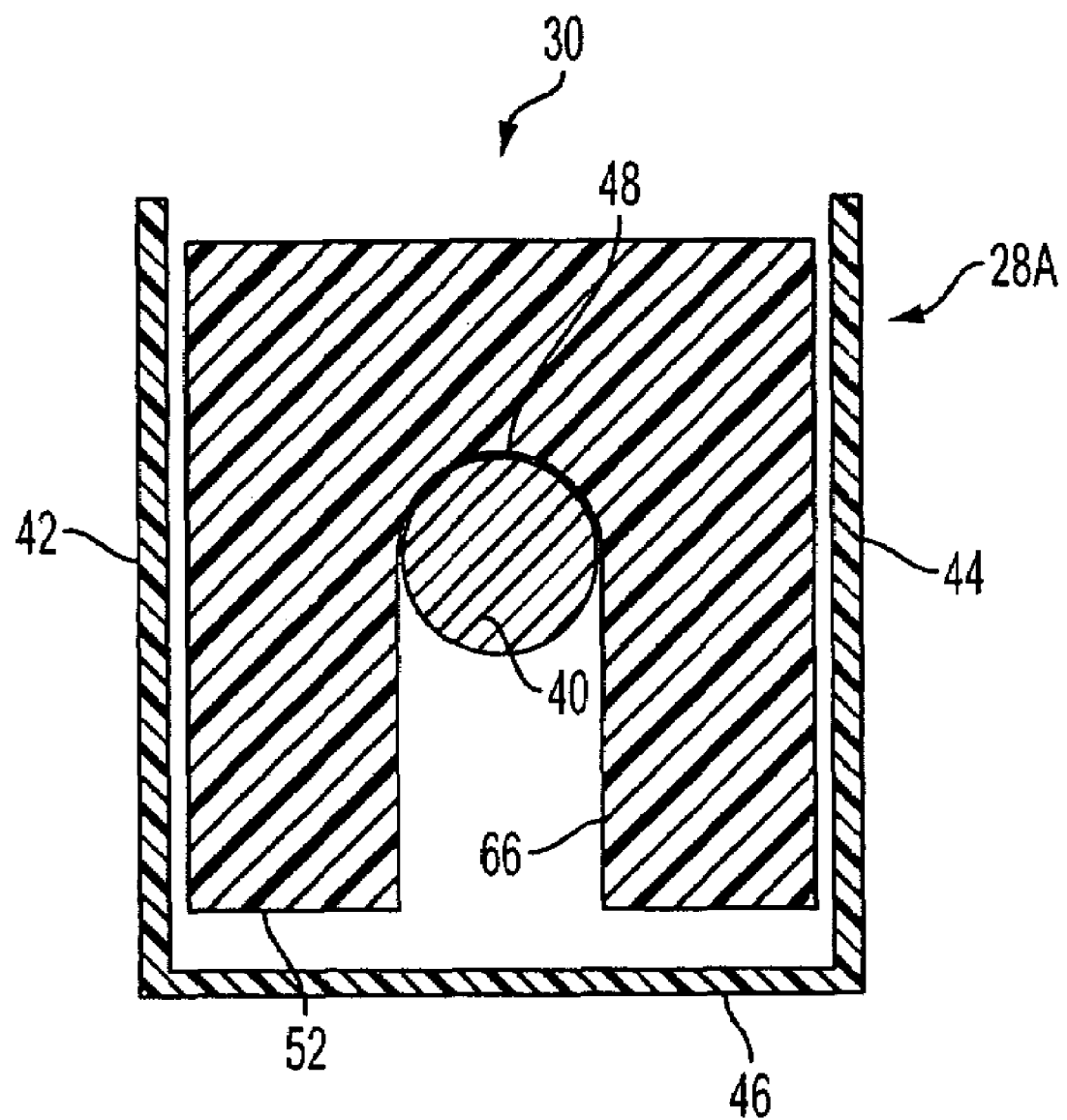
FIG. 4 is a simplified cross-sectional view of the feed channel of FIG. 3 taken along line 4-4 of FIG. 3.
Figure 20:
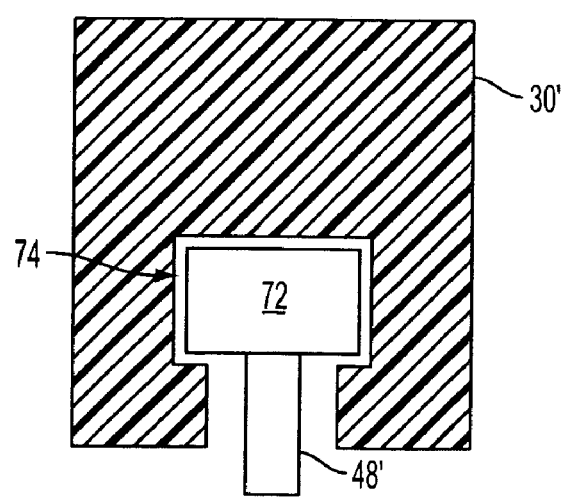
FIG. 20 is a top cross-sectional view of an alternative embodiment of an ink stick and guide rail.

FIG. 4 shows a cross sectional view of the embodiment of the longitudinal feed channel 28A of FIG. 3. For clarity of exposition, FIG. 4 focuses on feed channel 28A, however, embodiments of feed channels 28B, 28C, and 28D are likewise configured. As at least partially discernable in FIG. 4, the feed channel 28A is defined by lateral side walls 42, 44 that are substantially vertical, and a bottom 46. The side walls 42, 44 need not be solid, as the side surfaces 56 of the ink stick do not slide along them. Partial side walls may be advantageous in reducing the weight of the ink feed system. Other ink loader configurations are contemplated, including a vertical loader orientation where gravity would pull the ink toward the melt plate. A vertical or somewhat vertically oriented loader might utilize a captivating guide rail to secure an ink stick against disengagement in axes radial to the feed axis. For example, as shown in FIG. 20, a guide rail 48' may have an enlarged portion 72 that an ink stick 30' with a complementary enlarged inner slot section 74 may fit over. Loader surfaces and planes referred to may be different in alternative loader configurations up to and including the condition where support elements are not load bearing for the ink stick mass but instead coax or guide the ink along the feed path.

Each feed channel 28 includes one or more removable support members 40 for providing a contact surface for engaging surfaces of ink sticks as the ink sticks are fed along the feed channel. As shown in FIGS. 3 and 4, in one embodiment, the removable support member 40 comprises an elongate member extending from the insertion end to the melt end of the feed channel. The support member is configured to be removably attached in an ink loader to facilitate manual removal and reinstallation of the support member as needed without having to replace the entire feed system. For example, as discussed above, the sticky and waxy nature of the ink composition in solid form can result in ink material rubbing off of the ink stick and adhering to ink loader surfaces as the stick progresses along the feed channel. By substantially limiting the contact between the ink stick and the feed channel to the contact surface of the removable support member 40, cleaning and maintenance of the feed channel may be facilitated. Thus, when any of the feed channel support members become unduly contaminated by residual ink stick material, ink stick fragments, dust or dirt, and/or any other debris or at a predetermined maintenance interval service personnel or a printer user may remove the feed channel support members for cleaning and reinstallation, or replacement with new support members. The support member 40 is depicted as being round for simplification but could have a cross section of nearly any reasonable shape, such as a square, rectangle, oval, inverted "U" shape and so forth. The support might also be as deep or deeper than the slot in the ink even though it is shown as a fractional size relative to the ink slot depth. The support member may be tapered over its length such that ink movement could be dampened or change levels, as might be beneficial with a vertical or more vertically oriented loader.

In one embodiment, the feed channel support member 40, in addition to providing a contact surface, is configured to guide ink sticks from the insertion end to the melt end of an ink loader to maintain orientation and alignment of the ink sticks. Thus, in one embodiment, the support member 40 comprises a support/guide rail. The support/guide rail 40 comprises a cylindrical rod having an insertion end 41 that may be removably or releasably connected at or near the insertion end 45 of the feed channel and a melt end 43 that may be removably attached or supported near the melt end of the feed channel. The support/guide rail 40 may be removably attached to the feed channel using any suitable attachment method such as, for example, snap, clip, press-fit, etc.

The support/guide rail may be substantially centered in the lateral dimension of the feed channel so that it is aligned with the central longitudinal axis of the feed channel 28A (see FIG. 4). The feed channel support member 40 includes a contact surface 48 designed to interact with a guide element 66 formed in the bottom surface 52 of the ink stick 30 as discussed further below. The guide rail 40 support surface is vertically displaced from the bottom surface 46 of the feed channel at a distance that enables the bottom surface 52 of the ink stick 30 to remain clear of the bottom surface 46 of the feed channel. Reducing the opportunities for contact between the bottom surface of the ink stick body and the feed channel guide rail minimizes chance that chips or flakes of the ink material to interfere with the progress of the ink stick along the feed channel.

Figure 5:
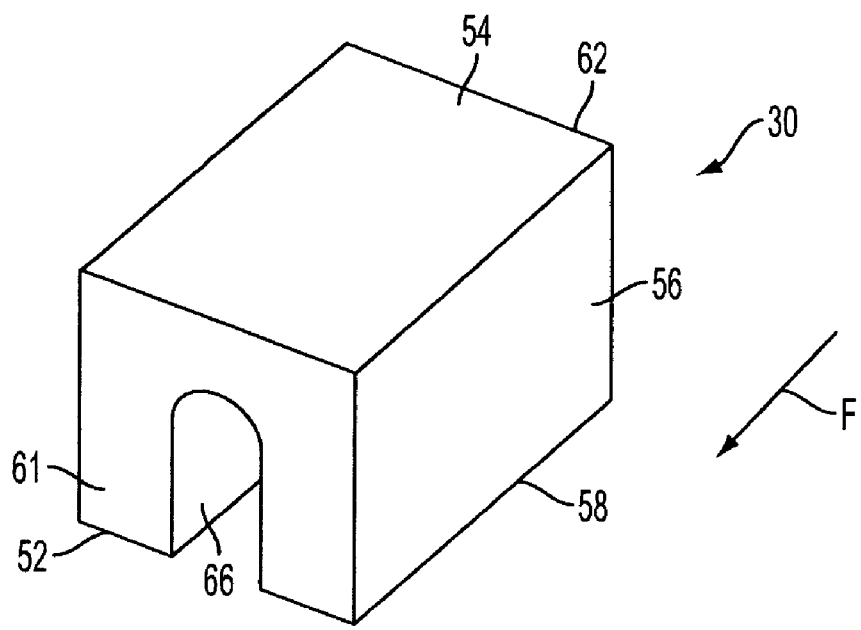
FIG. 5 is a perspective view of an ink stick configured for use in the phase change ink loader of FIGS. 3 and 4.
Figure 6:
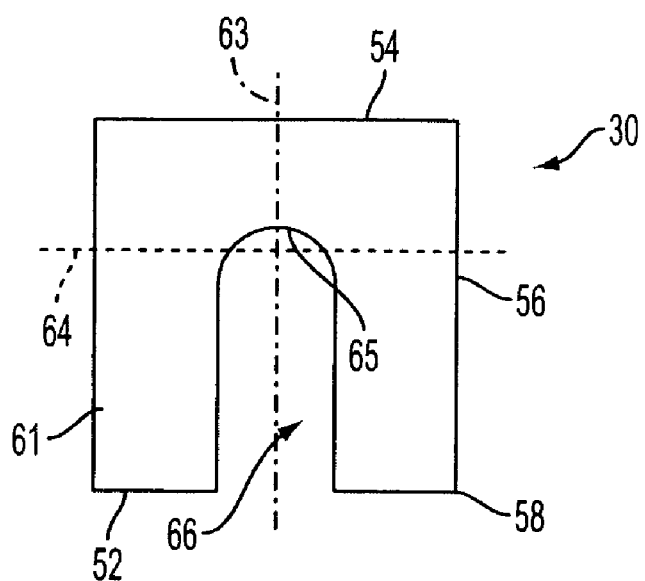
FIG. 6 is a front view of the ink stick of FIG. 5.

An exemplary ink stick including a guide element 66 is shown in FIGS. 5 and 6. The particular embodiment shown includes a substantially rectangular ink stick body that has a bottom surface 52, and a top surface 54, which may be substantially parallel to the bottom surface. A pair of general lateral side extremities or side surfaces 56 connects the bottom surface 52 and the top surface 54. The surfaces of the ink stick body need not be flat, nor need they be parallel or perpendicular one another. The lateral side surfaces 56 may be stepped so that the lower portion of the ink stick body is narrower than the upper portion, or the upper portion is narrower than the lower portion. In addition, or in the alternative, the lateral side surfaces 56 may be shaped to provide a keying function. The key shaped lateral side surfaces correspond to the lateral edges of the keyed openings in the key plate to provide a unique match between each keyed opening and the corresponding ink sticks intended for insertion through that keyed opening and into that feed channel. The ink stick additionally includes a first end surface 61 and a second end surface 62. In the particular embodiment illustrated, the first and second end surfaces are substantially parallel to one another, and substantially perpendicular to both the top and bottom surfaces, and to the lateral side surfaces.

The ink stick has a lateral center of mass 63 between the two lateral sides 56 of the ink stick body. In the particular embodiment illustrated, the weight distribution of the ink stick body is substantially uniform (not including protruding key elements), and the ink stick body is substantially symmetrical about its lateral center (not including protruding key elements), so that the lateral center of mass 63 is approximately at the midpoint between the lateral sides 56 of the ink stick body (not including protruding key elements). Similarly, the ink stick body has a vertical center of mass 64 that may be substantially midway between the top surface 54 of the ink stick body and the bottom surface 52 of the ink stick body.

The ink stick may include one or more guide elements 66 for interacting with guide members in a feed channel to guide the ink stick from the insertion end to the melt end of a feed channel. The support/guide rail 40 of the solid ink feed system and the guide element 66 formed in the ink stick body are compatible with one another, and for example, may have complementary shapes that need not match, a round or angled rail and curved or flat guide element, as example. The complementary shapes allow the guide element 66 of the ink stick body to slidingly engage the feed channel guide rail 40 of the ink stick feed channel 28.

In the embodiment of FIGS. 5 and 6, a guide element 66 comprises a substantially longitudinal guide slot formed in the bottom surface 52 of the ink stick that extends from end 61 to end 62, and is substantially aligned with the lateral center of mass 63 of the ink stick 30. As can be seen in FIG. 6, the vertical center of mass 64 may be at or below the innermost portion 65 or the central axis of the guide element 66. The weight of the ink stick body provides a vertical force to the interaction between the ink stick body guide element 66 and the feed channel guide rail 40 of the ink stick feed system. Aligning the guide element 66 with the lateral center of mass 63 and having the vertical center of mass 64 at or below the central axis of the support/guide rail enables an ink stick to hang from the support/guide rail such that all or a majority of the weight of the ink stick is borne by the rail, thus, substantially limiting the contact of the ink stick and the feed channel to the contact surface of the guide rail 40. Accordingly, in the exemplary embodiment shown in FIG. 8, substantially the only contacts between the ink sticks and the feed channels are the contacts between the guide slots 66 and the respective feed channel support/guide rails 40. Note that this configuration is different than previous center guide teaching not only in that the guide rail is replaceable but also that it may extend into the ink stick up from the bottom beyond the vertical center of gravity of the ink. This configuration reduces stick mass but with the benefit of better controlling angular orientation as it travels in the feed direction, allowing a simplified feed channel that could be implemented without constraining side walls or even a bottom surface.

Guiding the ink sticks to maintain their alignments in the respective feed channels and limiting the contact between the ink sticks and the feed channel structural elements, such as ribs, supports and other potentially restrictive surfaces, ameliorates and/or prevents jamming due to skewing of the ink sticks as they move through the respective feed channels. The cooperative actions of the feed channel support/guide rails 40 and the respective guide slots 66 reduce "steering" effects that the push blocks 34 may have when acting on a rear surface of the ink sticks 30. Thus, lateral offset pressure on the respective ink sticks by the push blocks 34 on the respective ink sticks 30 is of lesser concern, and maintaining a perfect lateral balance of the force exerted by the push blocks 34 on the respective ink sticks 30 is less critical than with some other designs.

Figure 7:
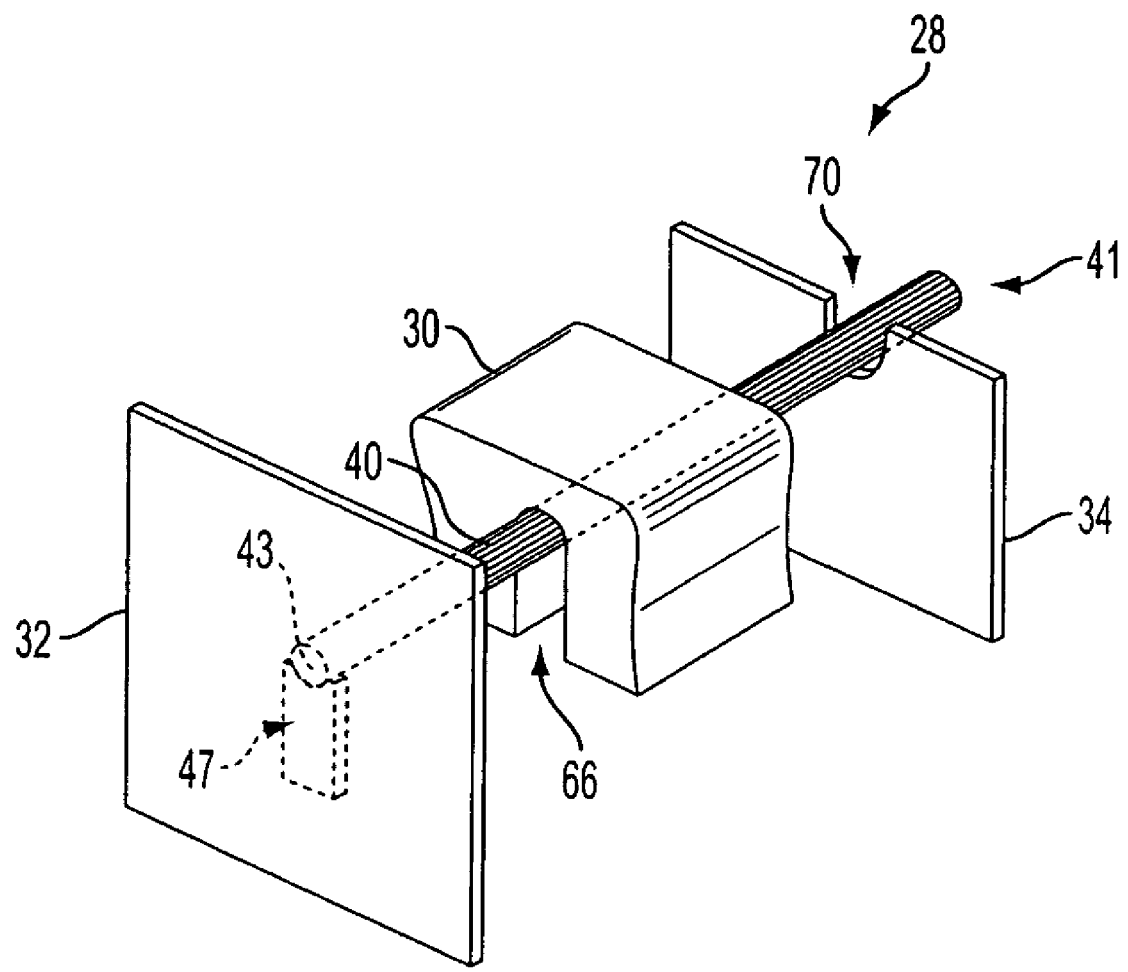
FIG. 7 is a top/front perspective view of an exemplary guide rail sub-system with an exemplary alternative ink stick supported thereon.

FIG. 7 is a perspective view of the feed channel 28 having a support/guide rail 40 and an exemplary ink stick 30A with a guide element 66 supported thereon. Due to the position of the support/guide rail 40 in the feed channel, the push block 34 may include openings 70 configured to allow the passage of the support/guide rail 40 as the push block urges ink sticks along the feed channel. In one embodiment the guide rail opening 70 comprises a generally U-shaped notch. The opening at the top of the notch 70 facilitates the insertion and removal of the support/guide rail 40 from the feed channel. The melt end of the rail 40 may be attached or supported near the melt end of the feed channel by a strut 47 (See FIG. 3). The strut 47 may be incorporated into the feed channel in which case the rail may be supported by or removably attached to the strut 47 using any suitable attachment method. Alternatively, the strut may be included as part of the support/guide rail 40. In this embodiment, the strut 47 may be configured to be removably attached to the bottom surface of the feed channel. The strut 47 may be positioned to correspond to the guide element of an ink stick so as not to interfere with the movement of an ink stick along the rail. Thus, in the embodiment of FIGS. 3 and 7, the strut 47 is substantially centered in the feed channel and extends from the bottom surface of the feed channel to the melt end 43 of the rail 40. The strut 47 may be positioned in any area along the length of the feed channel to support the rail 40, and/or multiple struts may be used along the length of the feed channel. In an alternative embodiment, a hole may be provided in the melt plate 32 so that the rail may extend through the melt plate 32 to be supported on the melt end wall of the feed channel 28.

Figure 8:
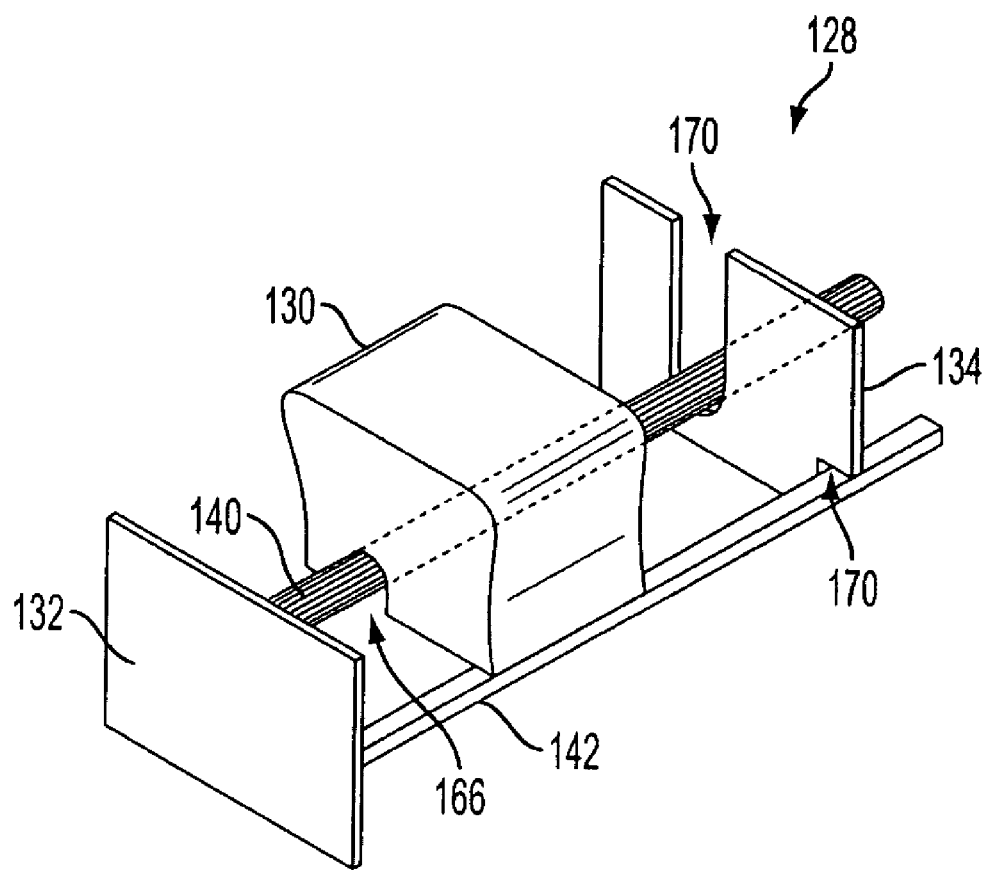
FIG. 8 is a top/front perspective view of an exemplary alternative guide rail sub-system with an exemplary alternative ink stick supported thereon.

FIGS. 8-12 show alternative embodiments of the support/guide rail system of FIG. 8 including alternative embodiments of ink sticks for use with the support/guide rail systems. In the embodiment of FIG. 8, the support/guide rail 140 is somewhat laterally offset from the middle of the feed channel 128. To help support the ink stick, a stabilizer 142 is mounted within the feed channel. The stabilizer 142 is laterally offset from the support/guide rail 140 to support a complementary surface of the ink stick. The stabilizer extends longitudinally along the bottom of the feed channel 128. In this embodiment, the removable support/guide rail 140 is positioned to still bear the majority of the weight of the ink stick while the minimal contact between the ink stick and the member 142 maintains the orientation of the ink stick as the ink stick is fed along the feed channel. The stabilizer 142 may also be removable.

Figure 9:
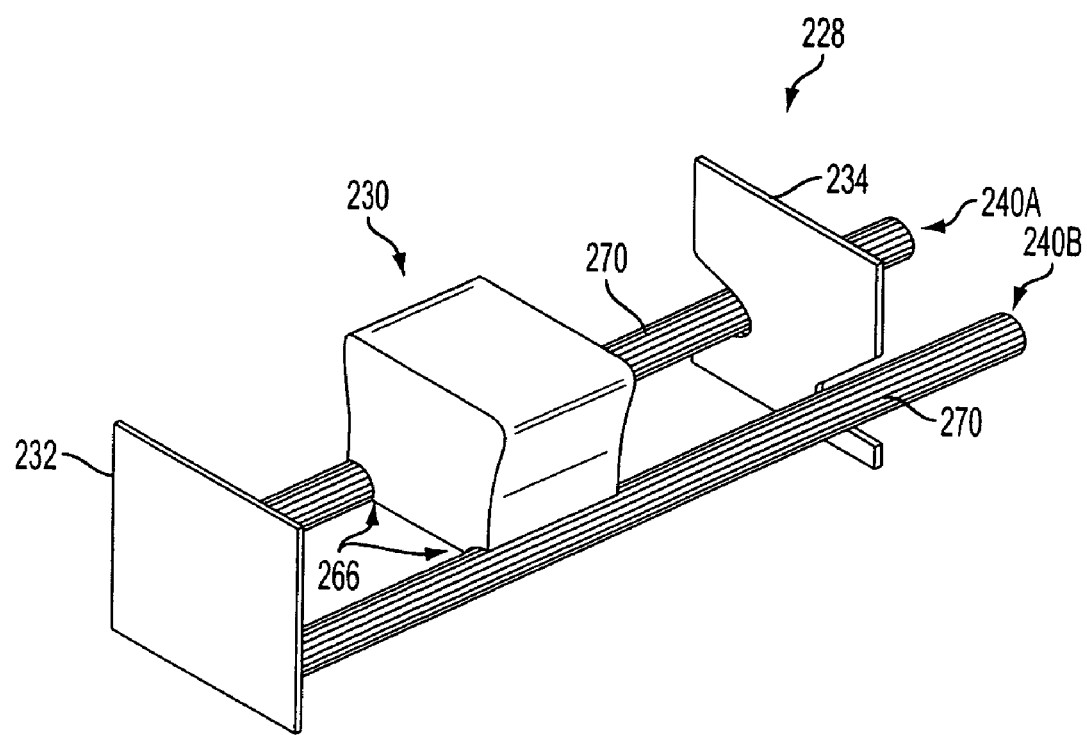
FIG. 9 is a top/front perspective view of an exemplary alternative guide rail sub-system with an exemplary alternative ink stick supported thereon.
Figure 10:
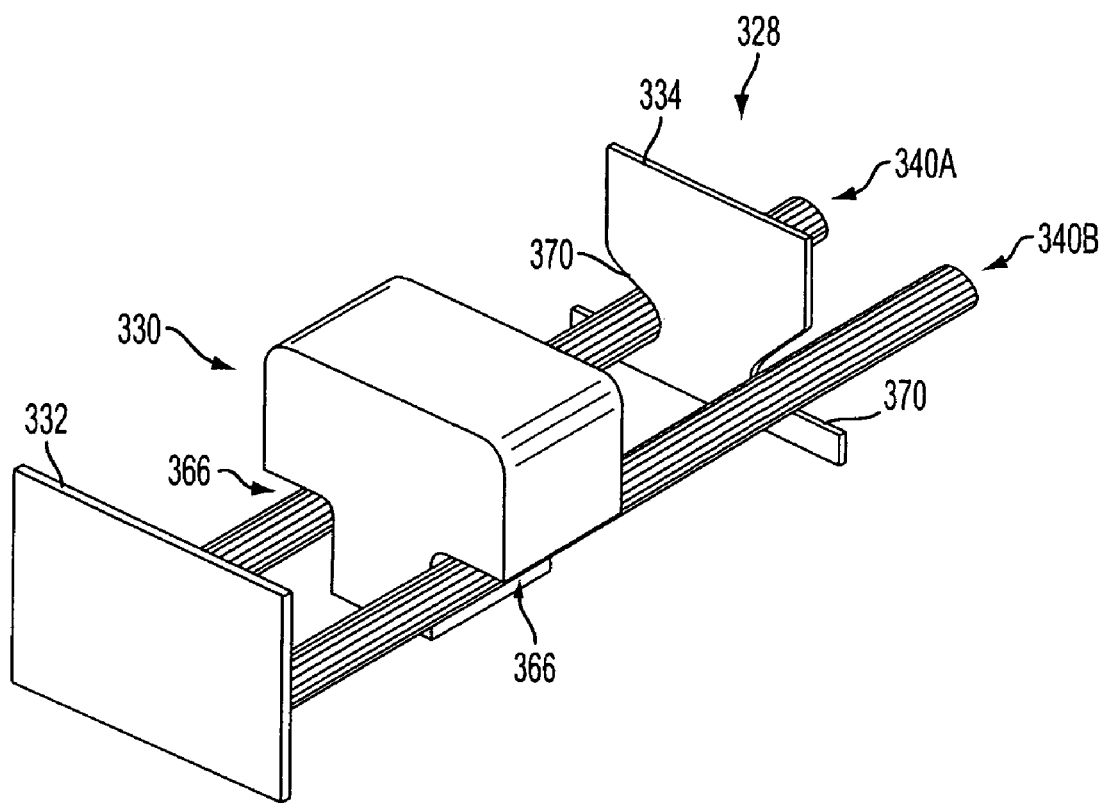
FIG. 10 is a top/front perspective view of an exemplary alternative guide rail sub-system with an exemplary alternative ink stick supported thereon.

FIGS. 9 and 10 show embodiments of the support/guide system that incorporate at least two guide rails laterally spaced across the feed channel to evenly distribute the weight of the ink stick across the guide rails. In the embodiment of FIG. 9, there are shown two guide rails 240A, 240B extending longitudinally along the bottom of the feed channel 228. The ink stick 230 includes guide element surfaces 266 on the ink stick that are configured to slidingly engage the guide rails 240A, 240B. In the embodiment of FIG. 10, the ink stick 330 includes guide elements 366 that may be formed as shoulders that rest upon the ink guide rails 340A, 340B. In an optimized version of this configuration, guide rails are spaced apart such that a substantial portion of the ink volume lies between the rails so that the ink stick is stably supported and guided regardless of the vertical relationship of the ink stick mass center to the rails.

Figure 11:
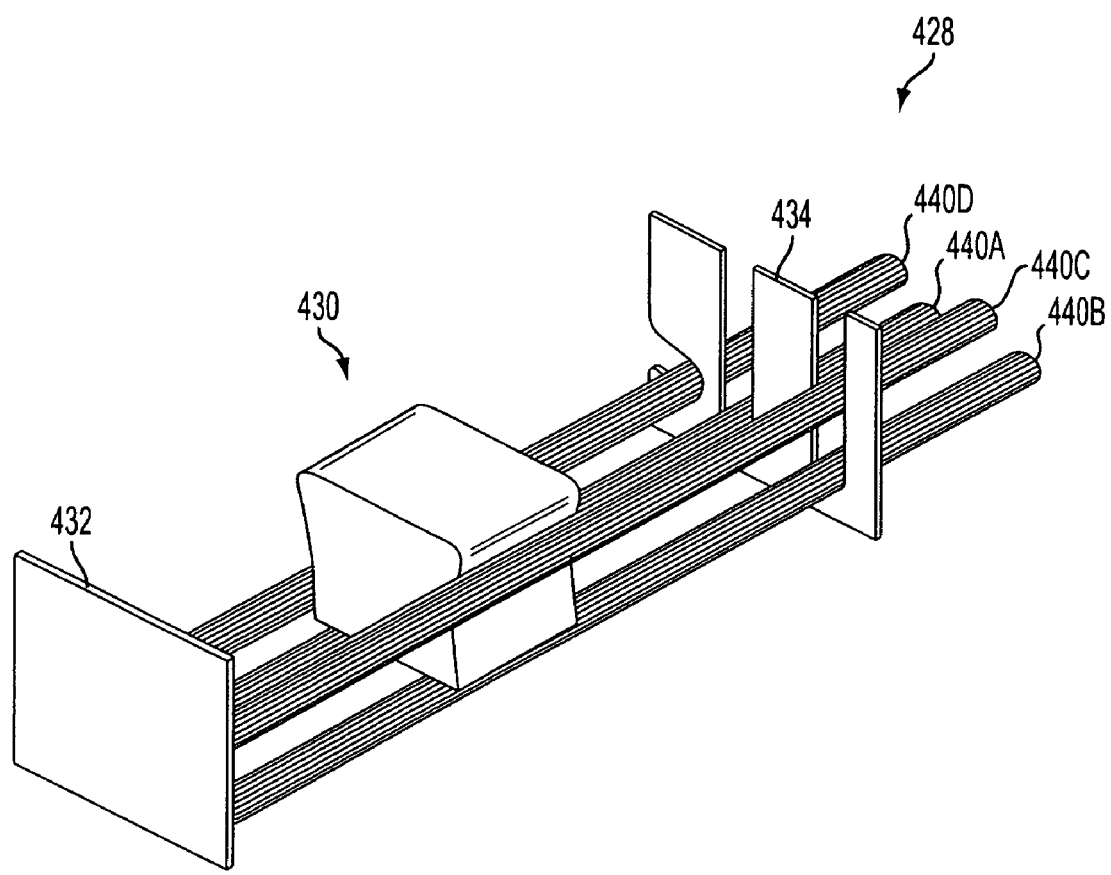
FIG. 11 is a top/front perspective view of an exemplary alternative guide rail sub-system with an exemplary alternative ink stick supported thereon.

FIG. 11 shows yet another embodiment of the support/guide system. In this embodiment, there are four removable guide rails 440A, 440B, 440C and 440D. Guide rails 440A and 440B act to support the weight of the ink stick while guide rails 440C and 440D act to maintain the alignment and orientation of the ink sticks as push block 434 urges the ink stick 430 along feed channel 428 toward melt plate 432.

Notwithstanding the substantially circular cross-sectional shapes of the exemplary feed channel support/guide rails shown in the figures, alternative feed channel support/guide rails may be extruded or formed into angled, curved, flat or stepped cross-sectional configurations that may also include positioning or attachment surfaces or features. Moreover, in alternative embodiments the feed channel support/guide rails may be replaced with suitable alternative removable structures for supporting and/or guiding ink sticks through their feed channels.

Figure 12:
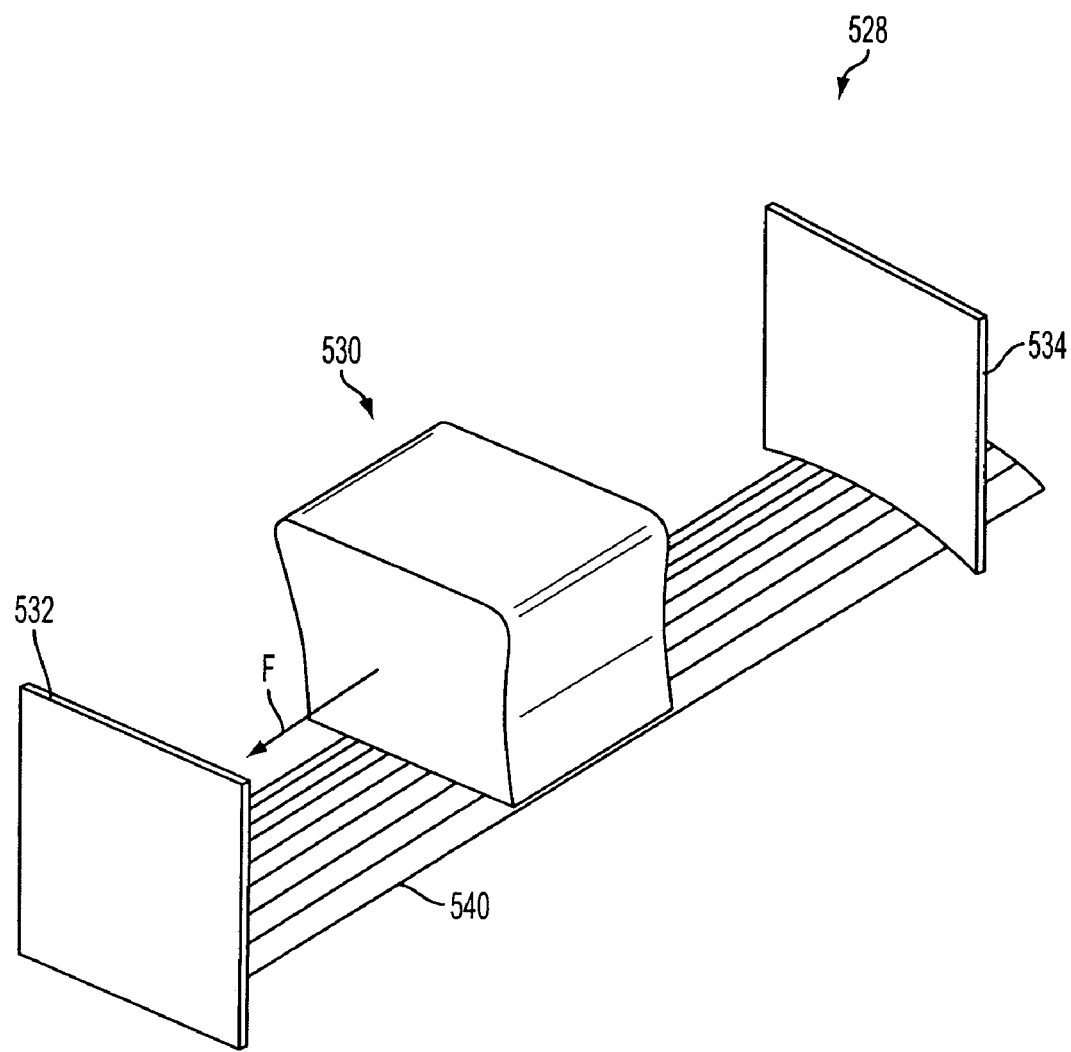
FIG. 12 is a top/front perspective view of an exemplary alternative guide support/runner sub-system with an exemplary ink stick supported thereon.
Figure 13:
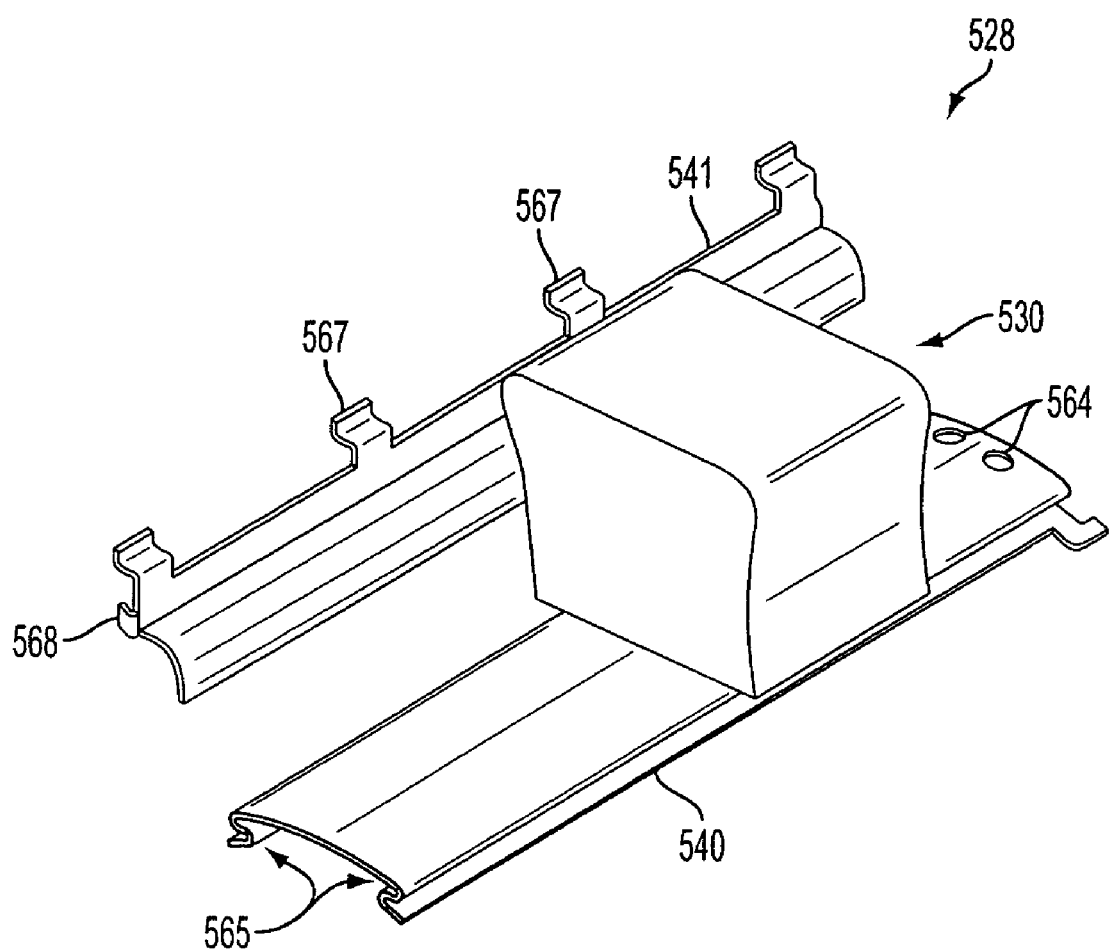
FIG. 13 is a top/front perspective view of a bottom feed channel support/guide runner and a side feed channel support/guide runner of an exemplary alternative guide support/runner sub-system with an exemplary ink stick supported thereon.

As an alternative to the removable support/guide rails as depicted in FIGS. 7-11, the support member for providing a contact surface for engaging surfaces of ink sticks as the ink sticks are fed along the feed channel may comprise one or more removable support runners as shown in FIGS. 12 and 13. FIG. 12 is a top/front perspective view of an exemplary guide support/runner 540 with the ink stick 530 supported thereon. As at least partially discernable in FIG. 12, the removable guide support/runner 540 is generally straight in the longitudinal direction along the respective feed direction F. The support/runner 540 may be curved in the direction transverse to the feed direction F. The raised portion of the curve may be substantially laterally centered in the feed channel. The curve of the support/runner 540 acts to limit the amount of surface area of the runner that the ink stick 530 contacts as the stick is fed along the feed channel by push block 534. The support/runner 540 may be removably or releasably connected to the feed channel 528 using any suitable attachment method such as, for example, slots in the end walls, tabs, etc. (See FIG. 18).

In alternative embodiments, the feed channel support/guide runners may be replaced with substantially flat removable support/guide runners and/or configured with one or more steps or angles for mounting or positioning or to catch ink particulate, may be resilient or non-resilient, and may be made of a plastic or any other suitable material(s). Additionally, alternative embodiments may include generally longitudinally curved or angled support/guide runners. Moreover, the alternative embodiments may be formed in other more complicated shapes for accommodating various insertion, placement, latching, sensing and clearance requirements that facilitate operations of the printers into which they are incorporated.

FIG. 13 is a top/front perspective view of a bottom feed channel support/guide runner 540 and a side feed channel support/guide runner 541 of an exemplary alternative feed channel 528 with the ink stick 530 supported thereon. The bottom feed channel support/guide runner 540 and the side feed channel support/guide runner 541 (or similar structures in alternative embodiments) may include holes 564 and/or notches 565 for mounting or positioning the runners and/or to provide means for dislodging or detaching and/or removing them for cleaning and/or replacement. Additionally, the bottom feed channel support/guide runner 540A and the side feed channel support/guide runner 541 (or similar structures in alternative embodiments) may incorporate tabs 567, one or more hooks 568, or other suitable protrusions at their ends or any other suitable point(s) along their lengths to facilitate their installation and/or removal, their positioning, their latching or other suitable fastening, and/or their accommodation of ink particles and/or other debris.

Figure 14:
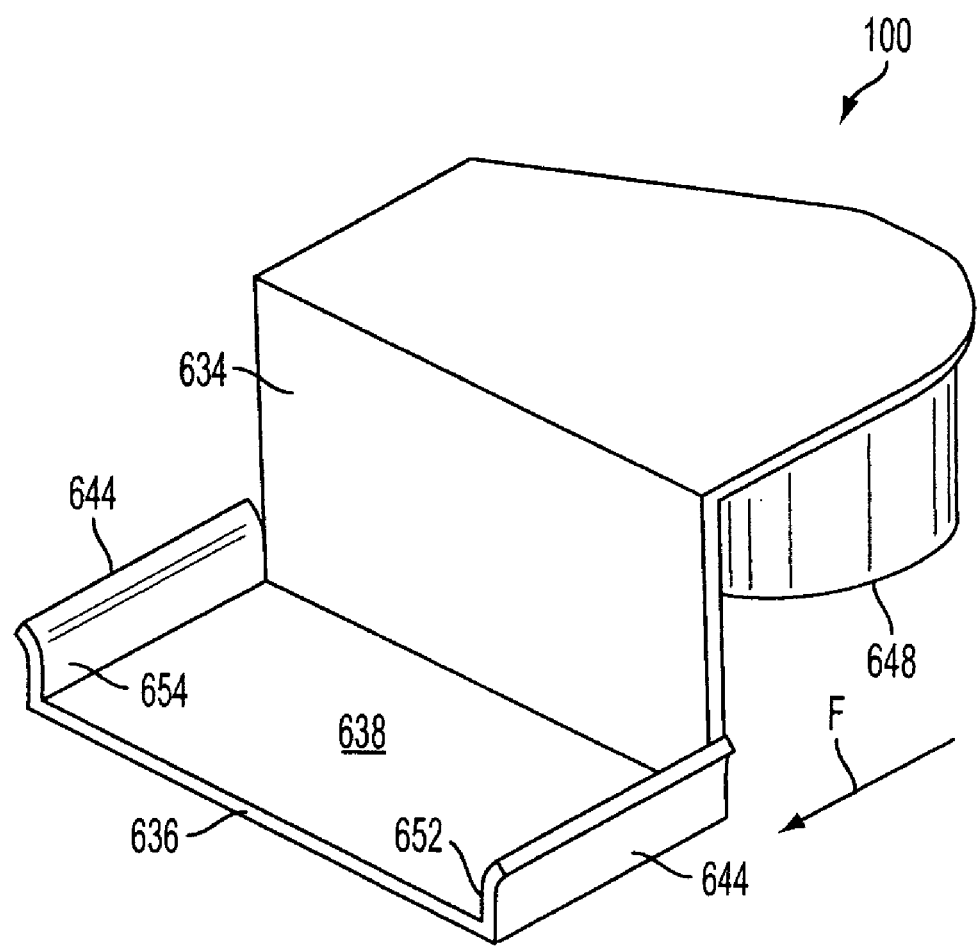
FIG. 14 is a top/front perspective view of an exemplary ink stick carrier.

Referring now to FIG. 14, there is shown an embodiment of another system for ensuring the proper support and feeding of an ink stick along a feed channel. In this embodiment, an ink carrier 100 is used to transport an ink stick from the insertion end to the melt end of the feed channel. The ink carrier 100 operates to transport a first ink stick to the melt plate before the next stick is loaded. The carrier may be withdrawn to the insertion end of the feed channel to load the next ink stick when the first stick has engaged the melt plate such that the front of the ink stick has bonded to the melt plate by re-solidifying after being partially melted by the melt plate. This ink carrier substantially eliminates the need to slide or roll ink along a feed path because all movement is performed by the carrier thereby reducing the possibility of jams occurring or stick-slip movement of the ink stick along the feed channel.

Figure 15:
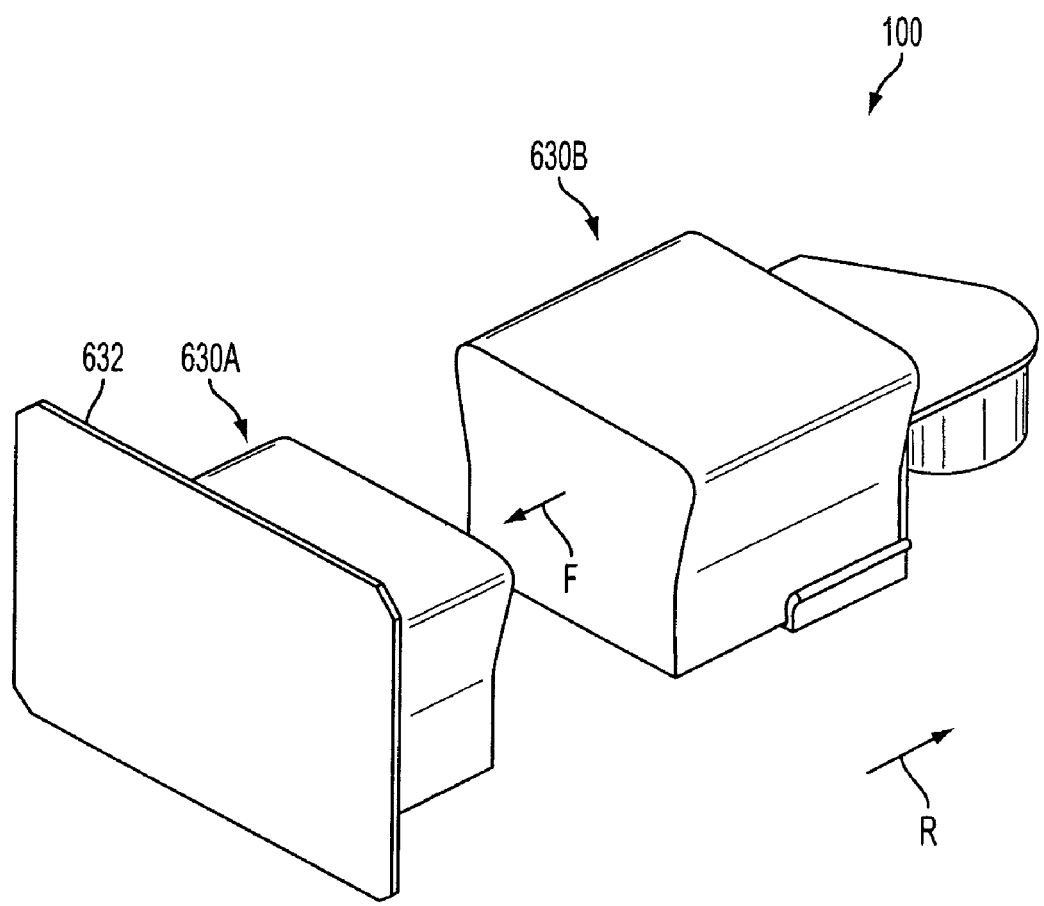
FIG. 15 is a top/front perspective view of exemplary operations of the ink stick carrier of FIG. 14.

As at least partially discernable in FIG. 14, the ink stick carrier 100 includes a generally vertically oriented push feature which will be termed a back wall 634. In the exemplary embodiment, the back wall 634 has about the same lateral and vertical dimensions as the respective push blocks 34 of FIGS. 7-13, however the push feature can be configured as anything less than a full wall provided is accomplishes the push function. Further, the exemplary ink stick carrier 100 includes a generally horizontally oriented base plate 638 oriented generally perpendicularly to the back wall 634. The base plate has a leading edge 636 for extending generally parallel to the respective feed direction F and side edges 652 and 654. The base plate 638 may have a lateral dimension between the side edges 652 and 654 that is sized to receive the width of an ink stick as shown in FIG. 15. In addition, as shown in FIG. 15, the base plate may have a longitudinal dimension extending from the back wall 634 to the leading edge 636 of the base plate that is configured to allow at least a portion of a leading end of an ink stick to extend beyond the leading edge of the base plate (in the feed direction F). By allowing a portion of an ink stick to extend beyond the leading edge of the base plate, the ink stick carrier may press an ink stick against the melt plate without coming into contact with the melt plate.

The ink stick carrier 100 may also include a pair of laterally opposed substantially vertical side walls 644 extending generally perpendicularly from the side edges 652, 654 of the base plate 638. Additionally, ink stick carrier 100 may include a coupling member 648 positioned at the rear or "behind" the back wall 634. The coupling member 648 operatively connects the ink stick carriers 100 to suitable drive mechanisms (not shown) for moving the ink stick carrier 100 during operation. The coupling can be formed as an integral part of the carrier or can be a separate part that facilitates attachment of the carrier to the drive. The drive mechanism may be a spring loaded push block, motor driven advancer or other drive configuration. Advancing the carrier with the drive mechanism may be manual, as with the typical push bock operation or may be mechanized. The coupling member 648 may be configured to allow removable attachment of the ink stick carrier to the drive mechanism of the of the ink loader for allowing the removal of the ink stick carrier for cleaning or replacement as necessary. In addition, ink stick carriers may be configured with added key features to suitably match various ink sticks as desired, thus facilitating reception, alignment, and or delivery or the ink sticks by the ink stick carriers during operation.

FIG. 15 is a top/front perspective view of an embodiment of a feed channel incorporating the ink stick carrier 100 of FIG. 14. In exemplary operation of a phase change ink printer including the ink stick carrier 100, a user (when the ink stick carrier 100 is "retracted" to an insertion position at the insertion end of the ink loader as generally indicated by directional arrow R and discussed further below) inserts a first ink stick 630A through a respective keyed openings (not shown) and onto the base plate 638 between the side walls 644 of the ink stick carrier 100. For clarity of exposition, in FIG. 14, the first ink stick 630A inserted is indicated is shown bonded to the melt plate 632 in a "melt position" (as discussed further below), while the second or subsequent ink stick 630B is shown in the "carrying position."

Figure 16:
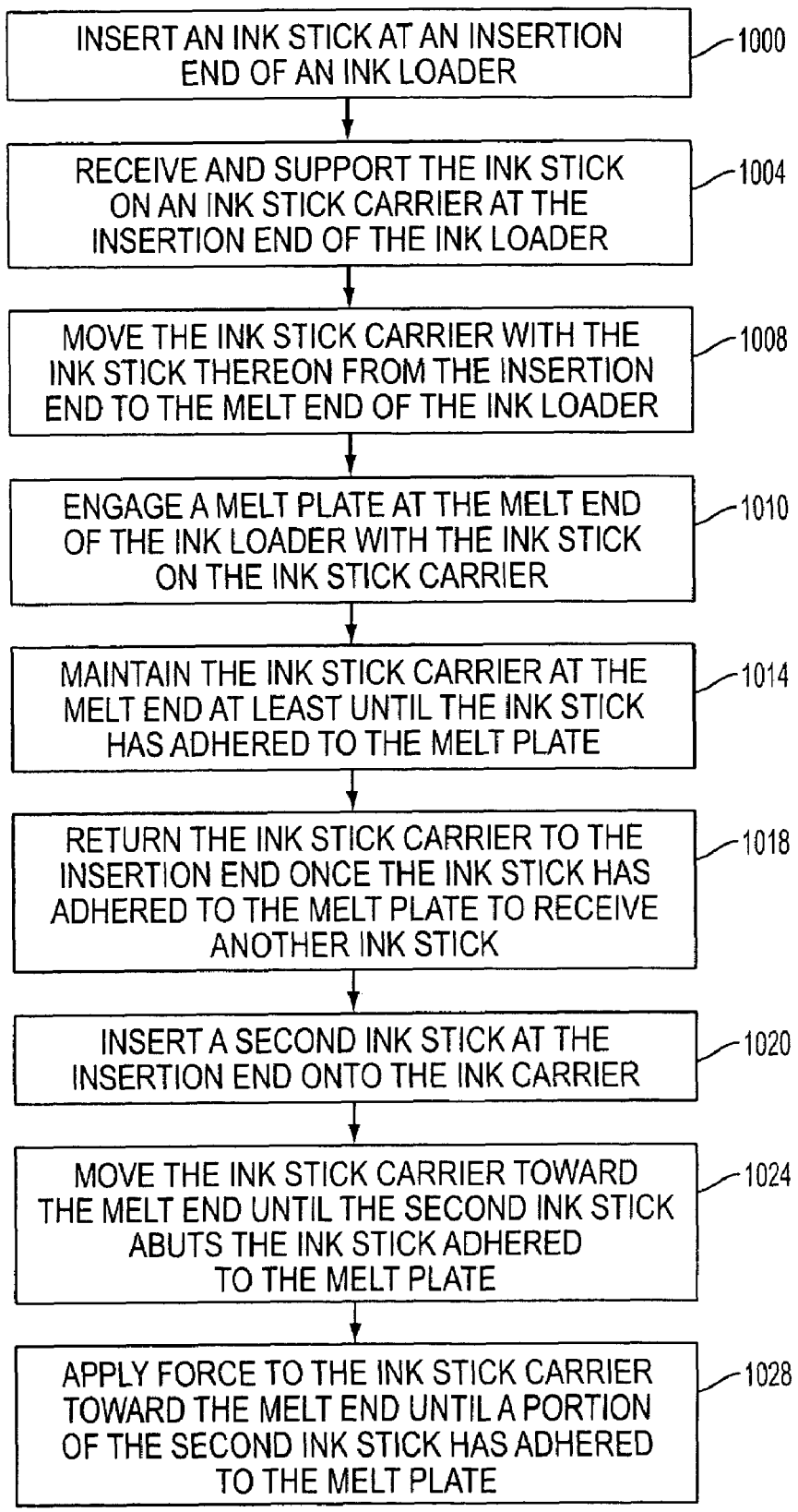
FIG. 16 is a flow diagram of exemplary phase change ink printer control logic for operating the ink stick carrier of FIG. 14.

FIG. 16 is a flow diagram of exemplary method of feeding ink sticks in a phase change ink imaging device that uses the ink stick carrier. The method comprises inserting into an ink loader of the phase change ink imaging device (block 1000). The inserted ink stick is received and supported on an ink stick carrier which is in at an insertion position in which the carrier is positioned at the insertion end of the ink loader (block 1004). Once the ink stick is on the ink stick carrier, the carrier is moved from the insertion end of the ink loader to the melt end of the ink loader (block 1008). At the melt end, the ink stick on the ink stick carrier engages a melt plate positioned at the melt end (block 1010). The ink stick carrier is maintained at the melt end at least until the ink stick has adhered to the melt plate (block 1014).

Once the ink stick has adhered to the melt plate, the ink stick carrier may be returned to the insertion end of the ink loader to receive another ink stick (block 1018). A second ink stick may then be inserted into the ink loader and received on the ink stick carrier (block 1020). The ink stick carrier with the second ink stick thereon is them moved toward the melt end of the loader until the second ink stick abuts the ink stick adhered to the melt plate (block 1024). Force may then be applied to the ink stick carrier toward the melt plate until the first ink stick has melted and the second ink stick has adhered to the melt plate (block 1028).

Figure 17:
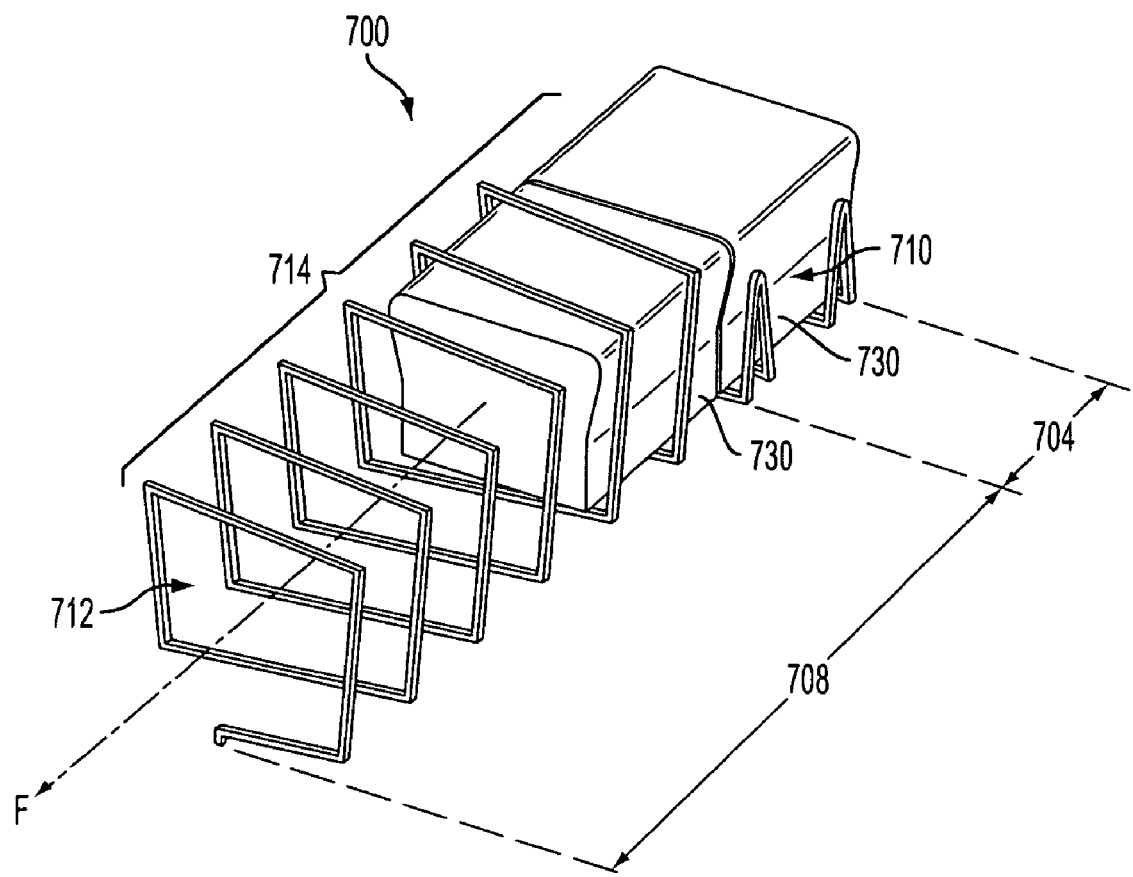
FIG. 17 is a top/front perspective view of an exemplary spring-like collapsible feed channel support/guide with two ink sticks therein.

FIG. 17 depicts an alternative embodiment of a system for feeding and supporting one or more ink sticks as the ink sticks are fed along a feed path to a melt plate. In particular, FIG. 17 is a top/front perspective view of an exemplary collapsible feed channel support/guide 700 with two of the ink sticks 730 therein. The embodiment of FIG. 17 shows a spring-like collapsible feed channel support/guide 700 that receives one or more of the ink sticks 730 or other suitable ink sticks at an insertion point and then shortens to match the diminishing length of the ink stack as the ink sticks are melted against a melt plate. This structure provides another approach to ameliorating ink stick ratcheting and/or jamming. An exemplary alternative phase change ink printer (not shown entirely, for clarity of exposition) may be made in a like manner as the phase change ink printer 10 (discussed above), except with like fashioned collapsible feed channel support/guides 700 in place of the respective feed channel support/guide rails 40.

The collapsible support may include an ink stick receiving end 710, an ink exit end 712 and a variable length support 714 extending between the receiving and exit ends. The ink stick receiving end 710 is configured to receive and support at least one ink stick inserted into an ink loader at the insertion end of a feed channel. The ink exit end 712 may be configured to be coupled proximate the melt end of the feed channel thereby facilitating feeding of ink sticks to the melt plate. The variable length support 714 is configured to vary in length corresponding to the distance of the receiving end to the exit end.

In one embodiment, the collapsible feed channel support/guide 700 is fashioned from wire, similar to a coiled compression spring, with an open-topped portion 704 at, at least, its insertion end 710 that allows for ink stick insertion and a generally square-coiled portion 708 that extends from the portion 704 to its exit end 714. In alternative embodiments, the coil shape could be square, generally V-shaped, rectangular but not necessarily square, curved but not necessarily circular, or even circular. Additionally, alternative embodiments may include guide and keying features to facilitate color and/or series exclusivity. In the exemplary embodiment, the collapsible feed channel support/guide 700 is supported and retained within the feed channel by suitable coupling features (not shown). In alternative embodiments, the collapsible feed channel support/guide 700 may be supported and retained by a simple rail or platform which may or may not be independent or part of another printer system or structure. Of course, the collapsible support may be configured to be removably mounted to the ink loader in any suitable manner.

In operation of the phase change ink printer including the collapsible feed channel support/guide 700, the push block (not shown) pushes the ink toward the melt plate (not shown) and then continues applying force so that the ink sticks 730 feed forward through the feed channel (along the feed direction F) as they are melted. Although the force necessary to move the push block in the exemplary embodiment is provided by a separate means, such as a constant force spring, lead-screw, linear motor and/or other suitable mechanism(s) (not shown), a similar collapsible support may provide the force necessary to move the push block in alternative embodiments. During operation, a number of the particles of ink that may break off the ink sticks 730 fall through the largely open collapsible feed channel support/guide 700. Moreover, in a number of cases, when an ink stick 730 begins to stick, the movement of the other ink sticks and the changing pitch of the collapsible feed channel support/guide 700 tends to free the stuck ink stick before it significantly inhibits reliable feeding.

Figure 18:
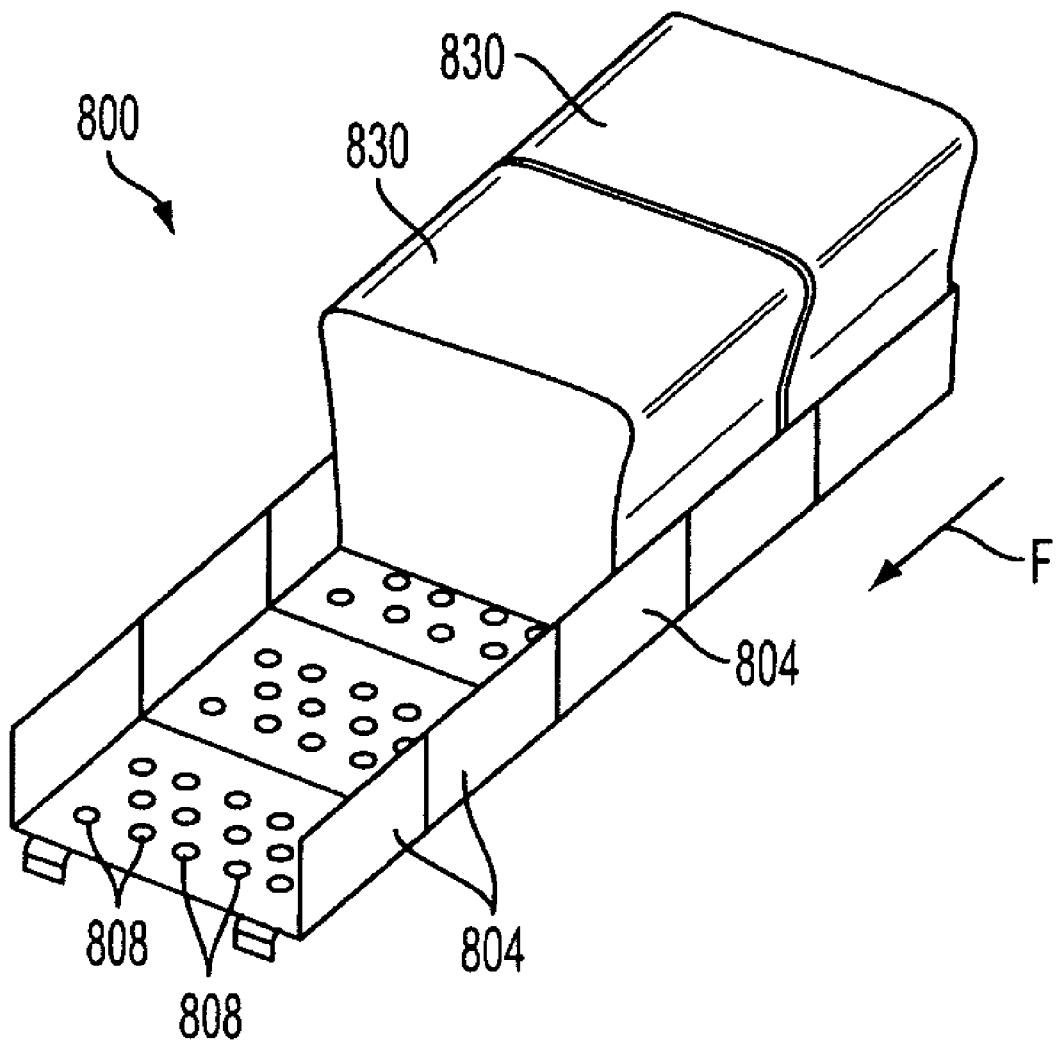
FIG. 18 is a top/front perspective view of an exemplary open-topped collapsible feed channel support/guide.
Figure 19:
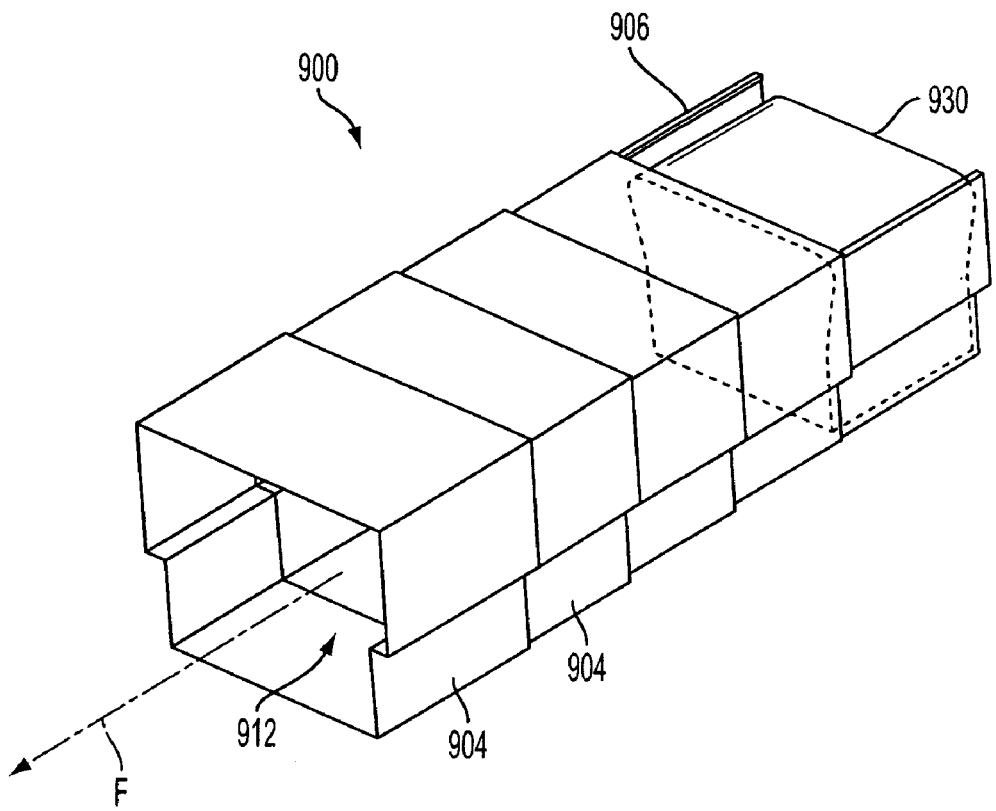
FIG. 19 is a top/front perspective view of an exemplary substantially closed-topped collapsible feed channel support/guide.

FIGS. 18 and 19 show alternative embodiments of a collapsible feed channel support/guide. FIG. 18 shows and exemplary open-topped collapsible feed channel support/guide 800; and FIG. 19 is a top/front perspective view of an exemplary substantially closed-topped collapsible feed channel support/guide 900. As demonstrated with the configurations of FIGS. 18 and 19, there are many alternative ways to create a collapsible support. Alternative embodiments may be fashioned from thin, shaped concentric open-topped sections or "sleeves" 804 (FIG. 18) and/or from thin, shaped concentric closed-topped sections or "sleeves" 904 (FIG. 19) and/or from thin, shaped concentric open-topped sections or "sleeves" 906 (FIG. 19). These structures may include other openings 808 (see FIG. 18) through which undesired ink particles from the ink sticks 830, 930 may fall during operation or without such openings. In the embodiments of FIGS. 18 and 19, in which the collapsible support/guide has concentric sleeves that become larger along the feed direction F (nearer the melt plate), the vertical steps (such as 912 between the sleeves 904 of FIG. 19) may avoid obstructing the ink stick feed and provide a degree of "self-cleaning." These features arise from the ink sticks pushing ink particles off the sleeves as they progress along the feed direction F.

Other alternative embodiments (not shown) may include molded forms configured to provide thinly coupled sections that stretch, slide or pivot to allow expansion or contraction, while other alternative embodiments may include multiple, interlocking pieces linked together to create integral collapsible supports. Any of these or other alternative embodiments may incorporate a progressive "spring" force that causes sections of the collapsible support to compress in sequence. Additionally, it is noted that suitable collapsible feed support/guide embodiments may be employed to allow the use of alternatively shaped or packaged ink with or without a "feed" wrap or bag, such that ink in smaller pellet form may be placed in collapsible "bags", as an example, where the bag would be replenished or could be removed and replaced when empty.

Those skilled in the art will recognize that numerous modifications can be made to the specific implementations described above. One example is that replaceable guide elements could be attached indirectly through additional plates, pins, standoffs or other such intermediate parts. The various male-female implementations of the various key features, for example, may be suitably reversed or inverted. Additionally, those skilled in the art will recognize that the guide rail(s) in the feed channel(s) and the complementary guide element(s) defined by the ink sticks may have numerous shapes other than the particular shapes illustrated. In addition, numerous other configurations of the feed channel, key plate, and other components of the ink feed system can be constructed, including angular orientation of the loader relative to gravity. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A removable ink stick support for use in an ink loader of a phase change ink imaging device comprising:

a first end for ink stick support, the first end being configured for removable attachment in a feed channel at a position proximate a melt end of an ink loader;

a second end for ink stick support, the second end being configured for removable attachment in the feed channel at a position proximate an insertion end of an ink loader; and a longitudinal member extending between the first and second ends, the longitudinal member being configured to provide at least one contact surface for a portion of an ink stick as the ink stick is fed along the feed channel from the insertion end of the ink loader to the melt end of the ink loader.

2. The ink stick support of claim 1, wherein the contact surface comprises at least one load-bearing contact for at least partially supporting the weight of the ink stick as the ink stick is urged along the feed channel from the insertion end of the ink loader to the melt end of the ink loader.

3. The ink stick support of claim 1, wherein the at least one contact surface is configured to provide substantially the only contact area between an ink stick and the feed channel.

4. The ink stick support of claim 2, wherein the longitudinal member comprises at least one guide rail, the at least one guide rail for guiding the ink stick from the insertion end to the melt end of the feed channel along the contact surface.

5. The ink stick support of claim 4, wherein the at least one guide rail is configured to be slidingly engaged by a guide element of the ink stick.

6. The ink stick support of claim 4, wherein the at least one guide rail comprises at least one cylindrical rod having an insertion end and a melt end, the melt end being configured for removable attachment in the feed channel at a position proximate the melt end of the ink loader and the insertion end being configured for removable attachment in the feed channel at a position proximate the melt end of the ink loader.

7. The ink stick support of claim 2, wherein the longitudinal member comprises at least one runner configured for removable attachment longitudinally along a surface of the ink loader from the insertion area to the melt area.

8. The ink stick support of claim 7, wherein the at least one runner comprises a first runner configured for removable attachment near a bottom plane of the feed channel, and at least one other runner configured for removable attachment near a side surface of the feed channel.

9. The ink stick support of claim 1, wherein the longitudinal member includes an enlarged portion that extends along at least a portion of the longitudinal length of the longitudinal member.

10. A solid ink feed system for use in a phase change ink imaging device, the system comprising:
an ink loader having an insertion end, a melt end, and a feed channel extending between the insertion end and the melt end;
at least one removable ink stick support having a first end that is removably connected at the insertion end of the feed channel, a second end that is removably connected to the melt end of the feed channel, and an elongate body between the first end and the second end of the at least one removable ink stick support, the elongate body being suspended in the feed channel and being configured to provide a contact surface for supporting and guiding an ink stick from said insertion end to said melt end of the ink loader; and
at least one guide element formed in a portion of a solid ink stick, said at least one guide element being configured to slide along the contact surface of the elongate body as the ink stick is being fed from the insertion end to the melt end of the ink loader.

11. The solid ink feed system of claim 10, wherein the contact surface comprises a load-bearing contact for at least partially supporting the weight of the at least one ink stick as the ink stick slides along the elongate body.

12. The solid ink feed system of claim 10, wherein the at least one contact surface is configured to be substantially the only guide between the ink stick and the feed channel.

13. The solid ink feed system of claim 10, wherein the elongate body comprises a support/guide rail substantially centered laterally in the feed channel substantially in line with a lateral center of mass of the ink stick and vertically positioned relative to a bottom surface of the ink stick such that a vertical center of mass of the ink stick is at or below a central axis of the support/guide rail.

14. The solid ink feed system of claim 13, wherein the at least one guide element comprises a slot substantially laterally centered in the bottom surface of the ink stick extending from a leading end to a trailing end of the ink stick, the slot having a width sized to receive the support/guide rail and a depth extending from the bottom surface toward a top surface of the ink stick to enable the vertical center of mass of the ink stick to be at or below an interior most portion of the slot.

15. The solid ink feed system of claim 10, the elongate body further comprises at least two guide rails laterally spaced across the feed channel to distribute the weight of the ink stick between the at least two guide rails, each of the guide rails having a first end that is removably connected at the insertion end of the ink loader and a second end that is removably connected to the melt end of the ink loader.

16. The solid ink feed system of claim 10, the elongate body further comprises at least two guide rails laterally spaced across the feed channel to constrain the ink stick position and orientation along at least a portion of the feed channel intermediate the insertion end and the melt end of the ink loader.

17. The solid ink feed system of claim 10 further comprising a push block for urging an ink stick along the feed channel, the push block including guide ink support openings that enable passage of the elongate body therethrough as the push block moves along the feed channel.

18. The solid ink feed system of claim 10, wherein the guide element of the ink stick engages the contact surface of the elongate body and precludes disengagement of the ink stick from the elongate body in radial axes over at least a portion of the feed channel intermediate the insertion end and the melt end of the ink loader.

19. A method of feeding an ink stick in a solid ink feed system of a phase change ink imaging device, the method comprising:
connecting a first end of a removable support member proximate a melt end of a longitudinal feed channel of a solid ink feed system;
connecting a second end of the removable support member proximate an insertion end of the longitudinal feed channel to enable the removable support member to extend from the insertion end of the longitudinal feed channel to the melt end of the longitudinal feed channel;
inserting at least one solid ink stick into the feed channel, the at least one ink stick contacting a contact surface of the removable support member; and
urging the at least one ink stick along the feed channel as a guide element of the at least one ink stick slidingly engages the contact surface of the removable support member.

* * * * *